(12) United States Patent
Ho

(10) Patent No.: US 8,187,447 B2
(45) Date of Patent: May 29, 2012

(54) ZINC FERRITE THIN FILM, METHOD FOR MANUFACTURING THE SAME AND APPLICATION THEREOF

(75) Inventor: Wen-Hsien Ho, Keelung (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 554 days.

(21) Appl. No.: 12/474,378

(22) Filed: May 29, 2009

(65) Prior Publication Data

US 2010/0154884 A1 Jun. 24, 2010

(30) Foreign Application Priority Data

Dec. 18, 2008 (TW) .............................. 97149473 A

(51) Int. Cl.
C25D 5/50 (2006.01)
C25D 3/36 (2006.01)
C25D 9/08 (2006.01)

(52) U.S. Cl. .................... 205/224; 205/245; 205/333

(58) Field of Classification Search .................. 205/224, 205/245, 333
See application file for complete search history.

(56) References Cited

U.S. PATENT DOCUMENTS 4,882,014 A * 11/1989 Coyle et al. ..................... 205/45
5,491,410 A * 2/1996 Nojima et al. ................ 324/248
5,785,837 A * 7/1998 Bhattacharya et al. ......... 205/74

OTHER PUBLICATIONS

Roy et al., "Magnetization anomalies of nanosize zinc ferrite particles prepared using electrodeposition", Journal of Magnetism and Magnetic Materials, 306 (2006), pp. 98-102.*
A. C. Hee et al., "Preparation of Nickel Zinc Ferrite by Electrophoretic Deposition", Journal of the Electrochemical Society, 159 (1,) 2012, pp. E18-E22.*
Gabriel Caruntu et al., "Synthesis and characterization of nanocrystalline zinc ferrite films prepared by liquid phase deposition", Journal of Materials Chemistry, 2004, 14, pp. 2753-2759.*

* cited by examiner

Primary Examiner — Patrick Ryan
Assistant Examiner — William Leader
(74) Attorney, Agent, or Firm — Thomas, Kayden, Horstemeyer & Risley, LLP

(57) ABSTRACT

Electrochemical methods for manufacturing a zinc ferrite ($ZnFe_2O_4$) thin film include preparing an electrodeposition solution and forming the zinc ferrite thin film on a conductive substrate under suitable conditions. The electrodeposition solution includes about $10^{-2}$ M to about $10^{-1}$ M zinc nitrate aqueous solution and about $10^{-3}$ M to about $10^{-2}$ M ferric nitrate aqueous solution.

15 Claims, 1 Drawing Sheet

ZINC FERRITE THIN FILM, METHOD FOR MANUFACTURING THE SAME AND APPLICATION THEREOF

RELATED APPLICATIONS

This application claims priority to Taiwan Application Serial Number 97149473, filed Dec. 18, 2008, which is herein incorporated by reference.

BACKGROUND

1. Field of Invention

The present invention relates to a zinc ferrite thin film and methods for manufacturing the same. More particularly, the present invention relates to electrochemical methods for manufacturing a zinc ferrite thin film.

2. Description of Related Art

Nano-sized zinc ferrite (zinc ferrite, $ZnFe_2O_4$) can be used as semiconductor material and photocatalyst material since it is capable of photo-electro conversion. As comparing with titanium dioxide with wide band gap (3.2 eV for anatase and 3.0 eV for rutile), nano-sized zinc ferrite has narrow band gap of about 1.9 eV and shows visible light absorption. Thus, nano-sized zinc ferrite has higher efficiency of sunlight utilization than neat titanium dioxide.

Generally, zinc ferrite can be formed on a substrate by a reactive sputtering technique and then annealed at a temperature of at least 500° C. to obtain the zinc ferrite thin film. Alternatively, powders of nano-sized zinc ferrite can be annealed at a temperature of at least 500° C. to obtain the zinc ferrite thin film. Methods for preparing said nano-sized zinc ferrite powders include sol-gel process, high temperature annealing process, and shock wave compress technique, etc.

Known methods for manufacturing the zinc ferrite thin film usually involves elaborate and costly apparatus and complicated process. Furthermore, said high annealing temperature limits the option of the material of the substrate and thus limits the application of the zinc ferrite thin film.

In view of the foregoing, there is a need to provide a method for manufacturing a zinc ferrite thin film, said method could employ less complicated apparatus and process and utilize lower annealing temperature than prior art does.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to electrochemical methods for manufacturing a zinc ferrite thin film. As comparing with reactive sputtering or other known methods for manufacturing zinc ferrite thin film, the electrochemical method for manufacturing zinc ferrite thin film could employ less complicated apparatus and process and utilize lower annealing temperature than prior art does. Furthermore, according to embodiments of the present invention, zinc ferrite thin film could be obtained without the annealing step.

According to embodiments of the present invention, the electrochemical method for manufacturing zinc ferrite thin film includes the procedure of preparing an electrodeposition solution, immersing a conductive substrate in the electrodeposition solution and electrodepositing the zinc ferrite thin film on the conductive substrate under suitable parameters, and drying the zinc ferrite thin film with a drying temperature of about 15-40° C. and a relative humidity of at least about 75%.

According to one embodiment of the present invention, the electrochemical method for manufacturing zinc ferrite thin film includes the procedure of preparing an electrodeposition solution, immersing a conductive substrate in the electrodeposition solution and electrodepositing a zinc ferrite thin film on the conductive substrate under suitable parameters, and drying the zinc ferrite thin film with a drying temperature of about 15-40° C. and a relative humidity of at least about 75%.

Said electrodeposition solution comprises about $10^{-2}$ M to about $10^{-1}$ M zinc nitrate aqueous solution and about $10^{-3}$ M to about $10^{-2}$ M ferric nitrate aqueous solution Said suitable parameters include: an Ag/AgCl reference electrode; an electrodeposition voltage of about 900-1100 mV; and a working distance of about 1-5 cm.

In further embodiments of the present invention, the zinc ferrite thin film obtained by the above-mentioned procedures can undergo an annealing step.

In another aspect, the present invention is directed to applications of said zinc ferrite thin film. For example, said zinc ferrite thin film can be used as a photoelectrode of a photosensitized solar cell. In addition, since said zinc ferrite thin film possesses the photo-electro conversion ability, zinc ferrite thin film can also act as a solid-state sensitizing layer of the photosensitized solar cell to partially or completely substitute for the dye layer of a the photosensitized solar cell.

According to one embodiment of the present invention, the photoelectrode of a photosensitized solar cell comprises a conductive substrate and a zinc ferrite thin film located on a surface of the conductive substrate.

In yet another aspect, the present invention is directed to a photosensitized solar cell that utilizes said zinc ferrite thin film as a photoelectrode and/or a solid-state sensitizing layer.

According to one embodiment of the present invention, the photosensitized solar cell comprises a photoelectrode, an electrolyte and a counter electrode laminated in this order. Said photoelectrode comprises a conductive substrate and a zinc ferrite thin film located on a surface of the conductive substrate, wherein said surface faces the counter electrode.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

DETAILED DESCRIPTION

Figure 1:
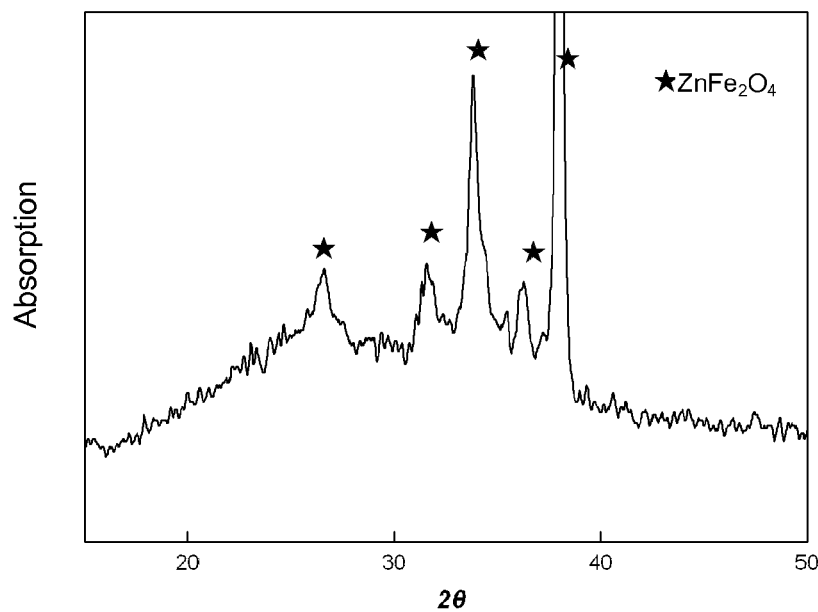
FIG. 1 is an X-ray diffraction pattern of a zinc ferrite thin film according to one embodiment of the present invention.

The detailed description provided below in connection with the appended drawings is intended as a description of the present embodiments and is not intended to represent the only forms in which the present embodiments may be constructed or utilized. The description sets forth the functions of the embodiments and the sequence of steps for constructing and operating the embodiments. However, the same or equivalent functions and sequences may be accomplished by different embodiments.

(I) Electrochemical Methods for Manufacturing Zinc Ferrite Thin Film

In one aspect, the present invention is directed to electrochemical methods for manufacturing a zinc ferrite thin film. For the purpose of illustration but not restriction, zinc-containing salt and iron-containing salt in the electrodeposition solution would dissociates to produce zinc ions and iron ions, said zinc ions and iron ions form complex ions with water molecules, and said complex ions would deposit on the surface of a conductive substrate (working substrate).

According to embodiments of the present invention, the electrochemical method for manufacturing zinc ferrite thin film includes the procedure of preparing an electrodeposition solution, immersing a conductive substrate in the electrodeposition solution and electrodepositing the zinc ferrite thin film on the conductive substrate under suitable parameters, and drying the zinc ferrite thin film.

According to embodiments of the present invention, said electrodeposition solution comprises about $10^{-2}$ M to about $10^{-1}$ M zinc nitrate aqueous solution and about $10^{-3}$ M to about $10^{-2}$ M ferric nitrate aqueous solution.

According to embodiments of the present invention, said step of electrodeposition is carried out at room temperature (about 23-27° C.). Besides, the electrodeposition solution can be stirred during the electrodeposition process, and the zinc ion and iron ion should be timely supplemented to maintain required concentration thereof.

According to embodiments of the present invention, parameters for electrodeposition of zinc ferrite thin film include: an Ag/AgCl reference electrode; a platinum counter electrode; an electrodeposition voltage of about 900-1100 mV; an electrodeposition time about 15-120 minutes, and a working distance of about 1-5 cm.

According to embodiments of the present invention, said conductive substrate can be a conductive fabric, a transparent conductive substrate, a metal substrate, or a metal oxide substrate. As an example, but not as a limitation, the conductive fabric can be made of conjugated polymers or made from metallic fibers/yarns; the transparent conductive substrate can be a fluorine-doped tin oxide/glass (FTO/glass) substrate, an indium tin oxide/glass (ITO/glass) substrate, or an ITO/polyethylene naphthalate (ITO/PEN) flexible substrate; and metal substrate can be a platinum substrate or a stainless steel substrate.

According to embodiments of the present invention, suitable drying temperature is about 15-40° C. and relative humidity is at least about 75%. In some preparation examples of the present invention, the zinc ferrite thin film was dried in a constant temperature and humidity apparatus, and the drying temperature used was about 30° C. and the relative humidity used was about 80%.

Furthermore, according to other embodiments of the present invention, the zinc ferrite thin film can be heat-treated at about 150-450° C. after the drying step. The heat treating step can be carried on several stages. For example, the heating step can include a first heating stage, a second heating stage, and a cooling stage. Specifically, in the first heating stage, the zinc ferrite thin film is heated from 23-27° C. to about 70-100° C. at a first heating rate of about 2° C. per minute for about 30-120 minutes; in the second heating stage, the zinc ferrite thin film is further heated to about 150-450° C. at a second heating rate of about 2° C. per minute for about 60-120 minutes; and in the cooling stage, the zinc ferrite thin film is cooled to about 23-27° C. at a cooling rate of about 2° C. per minute.

As will occur to those skilled in the art, the temperature of heat-treatment depends on the conductive substrate used. For example, with respect to plastic substrates, the temperature of heat-treatment should not exceed 300° C. and preferably should not exceed 150° C.

In the following preparation examples, some processing parameters were altered according to the embodiments of the present invention to manufacture zinc ferrite thin films. The altered parameter(s) of each example are indicated in Table 1. All examples listed in Table 1 were dried with a drying temperature of about 40° C. and a relative humidity of about 85%. In Examples 1-8, FTO/glass was used as the working electrode; while in Examples 9 and 10, ITO/PEN was used as the working electrode.

TABLE 1

| | $Zn(NO_3)_2$ (M) | $Fe(NO_3)_3$ (M) | Voltage (mV) | Time (min) | Working Distance (cm) | Heat-treating Temperature (° C.) |
|---|---|---|---|---|---|---|
| Example 1 | $10^{-1}$ | $10^{-2}$ | 1100 | 15 | 1 | 150 |
| Example 2 | $10^{-1}$ | $10^{-2}$ | 1100 | 15 | 1 | 300 |
| Example 3 | $10^{-1}$ | $10^{-2}$ | 1100 | 15 | 1 | 450 |
| Example 4 | $10^{-1}$ | $10^{-2}$ | 900 | 15 | 1 | 300 |
| Example 5 | $10^{-1}$ | $10^{-2}$ | 1100 | 30 | 1 | 300 |
| Example 6 | $10^{-1}$ | $10^{-2}$ | 1100 | 60 | 1 | 300 |
| Example 7 | $10^{-2}$ | $10^{-3}$ | 1100 | 30 | 1 | 300 |
| Example 8 | $10^{-1}$ | $10^{-3}$ | 1100 | 120 | 1 | 300 |
| Example 9 | $10^{-1}$ | $10^{-2}$ | 1100 | 15 | 1 | 150 |
| Example 10 | $10^{-1}$ | $10^{-2}$ | 1100 | 15 | 5 | 150 |

In Examples 1-10, zinc ferrite thin films could be formed on the working substrates after the drying step. The zinc ferrite thin films thus obtained were further heat treated to substantially remove residual water in the zinc ferrite thin films.

(II) Property Analysis of Zinc Ferrite Thin Films

1. X-Ray Diffraction Analysis

X-ray diffraction pattern of the zinc ferrite thin film was obtained by X-ray diffractometer (Model: MAC MO3X-HF Diffractometer) with the following settings: Kα radiation λ=1.5418; scan range 2θ=15-70°; scan rate: 1°/min; voltage: 40 kV; and generator current: 30 mA. FIG. 1 is an X-ray diffraction pattern of the zinc ferrite thin film of Example 1. In FIG. 1, diffraction peaks of zinc ferrite were marked with. The pattern shown in FIG. 1 confirms that zinc ferrite thin film could be manufactured by the methods mentioned above.

2. UV-Vis Absorption Analysis

As stated above, nano-sized zinc ferrite is capable of absorbing visible light and possesses photo-electro conversion ability; hence, the zinc ferrite thin film according to the embodiments of the present invention can be used as the solid-state sensitizing layer to partially or completely substitute for the dye layer of a the photosensitized solar cell.

Figure 2:
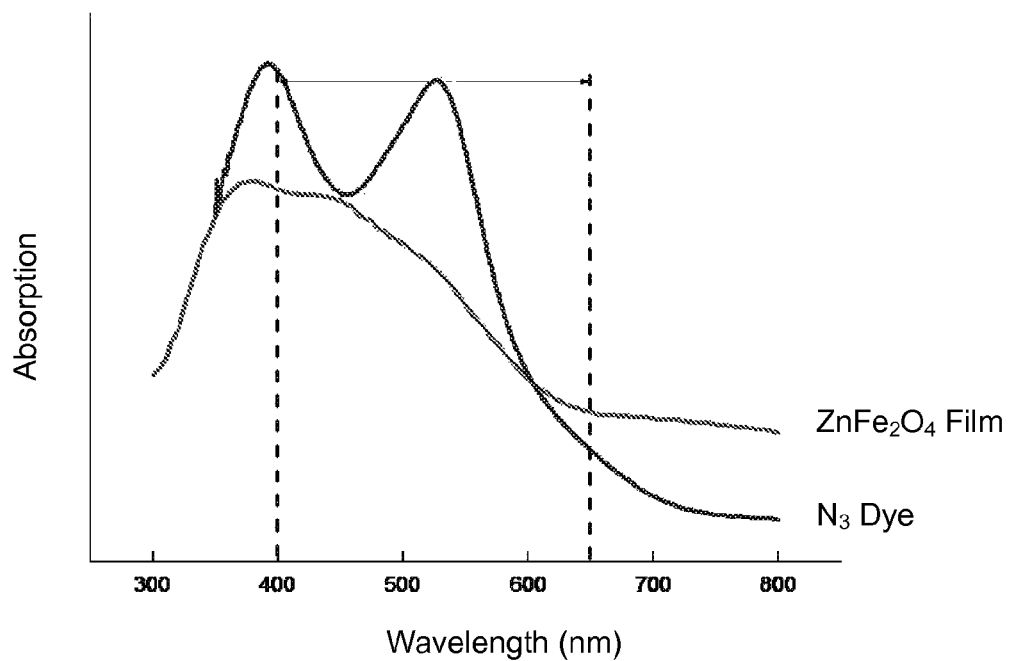
FIG. 2 is a UV-Vis absorption spectrum of a zinc ferrite thin film according to one embodiment of the present invention and a commercially available $N_3$ dye.

The absorption spectrum pattern of the zinc ferrite thin film was obtained by a spectrometer (Model: Hitachi U-4100). FIG. 2 is a UV-Vis absorption spectrum of a zinc ferrite thin film of Example 1 and a commercially available $N_3$ dye. The absorption spectrum shown in FIG. 2 suggests that the zinc ferrite thin film has absorption of visible light in the range of about 400-650 nm.

(III) Manufacture of Photoelectrodes and Photosensitized Solar Cells

In another aspect, the present invention is directed to applications of said zinc ferrite thin film. For example, said zinc ferrite thin film can be used as a photoelectrode of a photosensitized solar cell.

According to one embodiment of the present invention, the photoelectrode of a photosensitized solar cell may comprise a conductive substrate and a zinc ferrite thin film located on a surface of the conductive substrate.

According to embodiments of the present invention, the photoelectrode of a photosensitized solar cell may further comprise a conductive material located at said surface of the conductive substrate. Said conductive material could be titanium oxide, zinc oxide, copper oxide, zirconia, or a combination thereof.

For the purpose of illustration but not restriction, a zinc ferrite thin film can be formed on a surface of the conductive substrate according to the embodiment of the present invention, and then the conductive material can be formed on the same surface. Or, the conductive material can be formed on a surface of the conductive substrate, and then the zinc ferrite thin film can be formed on a surface of the conductive substrate according to the embodiment of the present invention. Or, the zinc ferrite and the conductive material can be formed on one surface of the conductive surface at the same time.

In addition, since said zinc ferrite thin film possesses the photo-electro conversion ability, zinc ferrite thin film can also act as a solid-state sensitizing layer of the photosensitized solar cell to partially or completely substitute for the dye layer of a the photosensitized solar cell. Thus, in yet another aspect, the present invention is directed to a photosensitized solar cell that utilizes said zinc ferrite thin film as a photoelectrode and/or a solid-state sensitizing layer.

According to one embodiment of the present invention, the photosensitized solar cell comprises a photoelectrode, an electrolyte and a counter electrode laminated in this order. Said photoelectrode comprises a conductive substrate and a zinc ferrite thin film located on a surface of the conductive substrate, wherein said surface faces the counter electrode.

According to embodiments of the present invention, any suitable electrolyte can be filled/formed between the photoelectrode and the counter electrode. For the purpose of illustration but not restriction, said electrolyte can be an acetonitrile solution comprising about 0.5 M lithium iodide and about 0.05 M iodine. Specifically, in the preparation examples of the present invention, the electrolyte is an acetonitrile solution containing about 0.5 M lithium iodide, about 0.05 M iodine and about 0.5 M 4-tert-butylpyridine.

Though the zinc ferrite thin film according to embodiments of the present invention possesses photo-electro conversion ability which can be used as the solid-state sensitizing layer photosensitized solar cell, materials can be photosensitized such as dye may be additionally used when manufacturing the photosensitized solar cell to enhance the efficiency of the solar cell.

Ruthenium complex is a commonly used photo-sensitized dye. Said ruthenium complex includes but is not limited to $N_3$ dye (cis-bis(isothiocyanato) bis(2,2'-bipyridyl-4,4'-dicarboxylato)-ruthenium(II)), $N_{712}$ dye (($Bu_4N)_4[Ru(dcbpy)_2(NCS)_2]$ Complex), $N_{719}$ dye (cis-bis(isothiocyanato)-bis-(2,2'-bipyridyl-4,4'-dicarboxylato)-ruthenium(II)-bis(tetrabutylammonium)) and $N_{749}$ dye ((2,2':6',2-terpyridine-4,4',4-tricarboxylate)ruthenium(II)tris(tetrabutylammonium) tris(isothiocyanate)), etc. However, the dyes listed above are only for examples, and as will occur to those skilled in the art, any other suitable dyes may be used in the photosensitized solar cell of embodiments of the present invention.

In the following preparation examples, zinc ferrite thin films of the Examples 1-10 were used to prepare photosensitized solar cells, and photoelectrochemical analysis was conducted to understand the photo-electro conversion efficiency and other current-voltage characteristics of each photosensitized solar cell and the results are listed in Table 2.

The photosensitized solar cell of the preparation example comprises a photoelectrode according to embodiments of the present invention; a platinum counter electrode; and an electrolyte of an acetonitrile solution containing about 0.5 M lithium iodide, about 0.05 M iodine and about 0.5 M 4-tert-butylpyridine. In the following description, PSC 1 refers to the photosensitized solar cell that uses zinc ferrite thin film of the Example 1 as a photoelectrode; similarly, PSC 3 refers to the photosensitized solar cell that uses zinc ferrite thin film of the Example 3 as a photoelectrode. Furthermore, among the preparation examples listed in Table 2, PSC 8 is the only photosensitized solar cell that used an $N_3$ dye, and the other photosensitized solar cells did not use additional dye in the solid-state sensitizing layer. The surface of the photoelectrode of PSC 8 was attached with the $N_3$ dye by conventional methods.

In the photoelectrochemical analysis, the photosensitized solar cell was irradiated with a light of 1000 W/m$^2$ using a solar simulator of AM 1.5 as a light source, and current-voltage characteristics were measured and calculated. The current-voltage characteristics include short circuit current (Jsc), open circuit voltage (Voc), fill factor (FF) and solar energy to electricity conversion efficiency ($\eta$) of the photosensitized solar cell of the present invention.

TABLE 2

| | Voc (mV) | Jsc (mA/cm$^2$) | FF | $\eta$ (%) |
|---|---|---|---|---|
| PSC 1 | 240 | 0.21 | 0.37 | 0.02 |
| PSC 2 | 210 | 0.49 | 0.33 | 0.03 |
| PSC 3 | 320 | 0.71 | 0.36 | 0.08 |
| PSC 4 | 170 | 0.35 | 0.32 | 0.02 |
| PSC 5 | 180 | 0.82 | 0.31 | 0.05 |
| PSC 6 | 310 | 0.21 | 0.31 | 0.02 |
| PSC 8 | 350 | 0.32 | 0.47 | 0.05 |
| PSC 9 | 270 | 0.07 | 0.40 | 0.01 |
| PSC 10 | 300 | 0.01 | 0.51 | 0.0014 |

As can be seen in Table 2, the change of process parameters of the electrochemical method for manufacturing the zinc ferrite thin film would affect the current-voltage characteristics of the photosensitized solar cell. Specifically, with respect to the heat-treating temperature of the zinc ferric thin film, it can be appreciated from PSC 1 (a heat-treating temperature of which is about 150° C.), PSC 2 (a heat-treating temperature of which is about 300° C.) and PSC 3 (a heat-treating temperature of which is about 450° C.) that as the heat-treating temperature increases from about 150° C. to about 450° C., the photo-electro conversion efficiency also increases from about 0.02% to about 0.08%.

Furthermore, with respect to the electrodeposition voltage for manufacturing the zinc ferric thin film, it can be appreciated from PSC 2 (an electrodeposition voltage of which is about 1100 mV) and PSC 4 (an electrodeposition voltage is about 900 mV) that the open circuit voltage, short circuit current, fill factor and photo-electro conversion efficiency of the photosensitized solar cell increase as the electrodeposition voltage increases.

With respect to the electrodeposition time of the zinc ferric thin film, it can be seen from PSC 2 (an electrodeposition time of which is about 15 minutes), PSC 5 (an electrodeposition time of which is about 30 minutes) and PSC 6 (an electrodeposition time of which is about 60 minutes) that electrodeposition time also affects the current-voltage characteristics of the photosensitized solar cell. It can be seen in Table 2 that the short circuit current and photo-electro conversion efficiency of PSC 5 are superior to that of PSC 2 and of PSC 6.

With other parameters remain unchanged, the material of the working electrode would also affect the current-voltage characteristics of the photosensitized solar cell. For example, PSC 1 used FTO/glass as the working electrode, while PSC 9 used ITO/PEN as the working electrode, and it can be seen in Table 2 that the short circuit current and photo-electro conversion efficiency of PSC 1 are superior to the same of PSC 9; while the open circuit voltage and fill factor of PSC 9 are superior to the same of PSC 1.

The working distance for manufacturing the zinc ferric thin film is the only difference between PSC 9 (a working distance of which is about 1 cm) and PSC 10 (a working distance of which is about 5 cm). The results shown in Table 2 suggest that the short circuit current and photo-electro conversion efficiency of PSC 9 are superior to that of PSC 10, while the open circuit voltage and fill factor of PSC 10 are superior to that of PSC 9.

As previously stated, PSC 8 is the only photosensitized solar cell that used an $N_3$ dye, and the other photosensitized solar cells did not use additional dye in the solid-state sensitizing layer. The results in Table 2 show that the open circuit voltage of PSC 8 is the highest among the listed examples, however, the short circuit currents of PSCs 2-5 are higher than that of PSC 8, and the fill factor of PSC 10 is also higher than that of PSC 8. Furthermore, the photo-electro conversion efficiency of PSC 3 is superior to that of PSC 8, while the same of PSC 5 is about the same as that of PSC 8. From the results shown in Table 2, it can be appreciated that the zinc ferrite thin film of the embodiments of the present invention can be used as the photoelectrode and as the solid-state sensitizing layer of the photosensitized solar cell to partially or completely substitute for the dye layer of a the photosensitized solar cell.

From the results and discussion described above, it is concluded that zinc ferrite thin film with different current-voltage characteristics by controlling the process parameters for manufacturing the zinc ferrite thin film according to the embodiments of the present invention; and the zinc ferrite thin films thus obtained possess desirable photo-electro conversion ability and may be useful in further industrial application.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An electrochemical method for manufacturing a zinc ferrite thin film, comprising:
   preparing an electrodeposition solution comprising about $10^{-2}$ M to about $10^{-1}$ M zinc nitrate aqueous solution and about $10^{-3}$ M to about $10^{-2}$ M ferric nitrate aqueous solution;
   immersing a conductive substrate in the electrodeposition solution and electrodepositing the zinc ferrite thin film on the conductive substrate under following parameters: an Ag/AgCl reference electrode; an electrodeposition voltage of about 900-1100 mV; and a working distance of about 1-5 cm; and
   drying the zinc ferrite thin film with a drying temperature of about 15-40° C. and a relative humidity of at least about 75%.

2. The electrochemical method for manufacturing a zinc ferrite thin film of claim 1, wherein the electrodeposition solution comprises about $10^{-1}$ M zinc nitrate aqueous solution.

3. The electrochemical method for manufacturing a zinc ferrite thin film of claim 1, wherein the electrodeposition solution comprises about $10^{-2}$ M ferric nitrate aqueous solution.

4. The electrochemical method for manufacturing a zinc ferrite thin film of claim 1, wherein the electrodeposition voltage is about 1100 mV.

5. The electrochemical method for manufacturing a zinc ferrite thin film of claim 1, wherein an electrodeposition time about is 15-120 minutes.

6. The electrochemical method for manufacturing a zinc ferrite thin film of claim 5, wherein the electrodeposition time is about 120 minutes.

7. The electrochemical method for manufacturing a zinc ferrite thin film of claim 1, wherein the working distance is about 1 cm.

8. The electrochemical method for manufacturing a zinc ferrite thin film of claim 1, wherein the drying temperature is about 30° C.

9. The electrochemical method for manufacturing a zinc ferrite thin film of claim 1, wherein the relative humidity is about 80%.

10. The electrochemical method for manufacturing a zinc ferrite thin film of claim 1, wherein the electrochemical method is carried out at about 23-27° C.

11. The electrochemical method for manufacturing a zinc ferrite thin film of claim 1, wherein the conductive substrate is a conductive fabric, a transparent conductive substrate, a metal substrate, or a metal oxide substrate.

12. The electrochemical method for manufacturing a zinc ferrite thin film of claim 11, wherein the transparent conductive substrate is an FTO/glass substrate, an ITO/glass substrate, or an ITO/PEN substrate.

13. The electrochemical method for manufacturing a zinc ferrite thin film of claim 11, wherein the metal substrate is a platinum substrate or a stainless steel substrate.

14. The electrochemical method for manufacturing a zinc ferrite thin film of claim 1, further comprising heat-treating the zinc ferrite thin film at about 150-450° C.

15. The electrochemical method for manufacturing a zinc ferrite thin film of claim 14, wherein the heat-treating step comprises a first heating stage, a second heating stage and a cooling stage, wherein
   in the first heating stage, the zinc ferrite thin film is heated from 23-27° C. to about 70-100° C. at a first heating rate of about 2° C. per minute for about 30-120 minutes;
   in the second heating stage, the zinc ferrite thin film is further heated to about 150-450° C. at a second heating rate of about 2° C. per minute for about 60-120 minutes; and
   in the cooling stage, the zinc ferrite thin film is cooled to about 23-27° C. at a cooling rate of about 2° C. per minute.

* * * * *